United States Patent
Crawford et al.

(10) Patent No.: US 9,004,097 B2
(45) Date of Patent: Apr. 14, 2015

(54) PRESSURE CONTROL VALVE WITH PRESSURE CYCLING CONTROL

(71) Applicant: Nelson Irrigation Corporation, Walla Walla, WA (US)

(72) Inventors: Steven E. Crawford, Walla Walla, WA (US); Robert D. Klein, Milton-Freewater, OR (US)

(73) Assignee: Nelson Irrigation Corporation, Walla Walla, WA (US)

( * ) Notice: Subject to any disclaimer, the term of this patent is extended or adjusted under 35 U.S.C. 154(b) by 121 days.

(21) Appl. No.: 13/900,137

(22) Filed: May 22, 2013

(65) Prior Publication Data
US 2013/0312849 A1   Nov. 28, 2013

Related U.S. Application Data

(60) Provisional application No. 61/650,063, filed on May 22, 2012.

(51) Int. Cl.
| | |
|---|---|
| *F16K 17/10* | (2006.01) |
| *G05D 7/01* | (2006.01) |
| *F16K 11/07* | (2006.01) |
| *F16K 47/02* | (2006.01) |
| *G05D 16/16* | (2006.01) |

(52) U.S. Cl.
CPC ............ *G05D 7/014* (2013.01); *F16K 11/0712* (2013.01); *F16K 47/023* (2013.01); *G05D 16/163* (2013.01)

(58) Field of Classification Search
CPC ..... F16K 7/126; F16K 1/523; F16K 31/0696; F16K 17/105; F15B 13/0402; G05D 16/0663

USPC .................. 137/492, 492.5, 505.11, 118.06, 137/625.25–625.27, 625.6–625.69; 251/284, 285, 64, 331
See application file for complete search history.

(56) References Cited

U.S. PATENT DOCUMENTS

| | | | | | |
|---|---|---|---|---|---|
| 1,566,850 | A | * | 12/1925 | Frenne et al. ............... | 137/492.5 |
| 2,736,337 | A | * | 2/1956 | Parks et al. ................. | 137/492.5 |
| 2,745,429 | A | * | 5/1956 | Crookston ................. | 137/492.5 |
| 2,877,791 | A | * | 3/1959 | Rich ............................ | 137/487 |

(Continued)

OTHER PUBLICATIONS

"Innovation in Irrigation Nelson—Control Diagrams—800 Series Control Valves", May 2004, pp. 9.1-9.4, vol. 9, Nelson Irrigation Corp., Walla Walla, WA.

(Continued)

*Primary Examiner* — John K Fristoe, Jr.
*Assistant Examiner* — Minh Le
(74) *Attorney, Agent, or Firm* — Nixon & Vanderhye P.C.

(57) ABSTRACT

A spool valve includes a housing having a spring-enclosing portion and a spool-enclosing portion aligned along a longitudinal axis. A spool is mounted for reciprocal axial movement in the housing and a piston is fixed to one end of the spool. The spool-enclosing portion supports a stationary bushing having a bore receiving an opposite control end of the spool, the bushing formed with a first plurality of radially-oriented passages opening into an annular groove formed in the bore, the groove having sloped side edges. The spool supports plural ring-seals arranged to engage the sloped side edges of the annular groove and thereby seal off the radially-oriented passages when the spool is in a neutral position. Movement of the spool is adjustably limited in one direction and dampened in both axial directions.

23 Claims, 14 Drawing Sheets

(56) References Cited

U.S. PATENT DOCUMENTS

| | | | | |
|---|---|---|---|---|
| 3,304,951 | A | * | 2/1967 | Farris .................. 137/492 |
| 3,572,359 | A | * | 3/1971 | Weise ..................... 137/85 |
| 3,636,973 | A | * | 1/1972 | Roeske ................ 137/488 |
| 3,756,264 | A | * | 9/1973 | Fisher ................. 137/116.3 |
| 3,820,556 | A | * | 6/1974 | Millar et al. ........... 137/220 |
| 3,865,132 | A | * | 2/1975 | Wiegand ............. 137/492.5 |
| 4,085,775 | A | * | 4/1978 | Steele, Jr. ............ 137/625.5 |
| 4,313,460 | A | * | 2/1982 | Johnson ................ 137/489 |
| 4,313,462 | A | * | 2/1982 | Adamson ............. 137/512.1 |
| 4,325,406 | A | * | 4/1982 | Bron ................... 137/492.5 |
| 4,586,533 | A | * | 5/1986 | Estes .................... 137/488 |
| 4,609,008 | A | * | 9/1986 | Anderson et al. ...... 137/488 |
| 4,611,631 | A | * | 9/1986 | Kosugi et al. ...... 137/625.65 |
| 4,621,656 | A | * | 11/1986 | Ichimaru .......... 137/625.66 |
| 4,632,143 | A | * | 12/1986 | McNeely ............ 137/488 |
| 4,823,840 | A | * | 4/1989 | Kosugi et al. ...... 137/625.27 |
| 4,917,144 | A | * | 4/1990 | Giles .................... 137/488 |
| 4,986,738 | A | * | 1/1991 | Kawasaki et al. ....... 417/304 |
| 5,671,774 | A | * | 9/1997 | Klein et al. ............ 137/486 |
| 5,725,015 | A | * | 3/1998 | Theodos et al. ........ 137/488 |
| 5,842,501 | A | * | 12/1998 | Powell et al. .......... 137/489 |
| 5,950,657 | A | * | 9/1999 | Lai et al. ............... 137/102 |
| 5,996,606 | A | * | 12/1999 | Iwasaki et al. ......... 137/110 |
| 6,488,050 | B1 | * | 12/2002 | Jabcon ............... 137/625.65 |
| 7,168,444 | B2 | | 1/2007 | Sesser et al. |
| 7,189,186 | B2 | * | 3/2007 | Weber et al. ............ 477/99 |
| 7,210,501 | B2 | * | 5/2007 | Neff et al. .......... 137/625.65 |
| 7,370,667 | B2 | | 5/2008 | Sesser et al. |
| 8,066,026 | B2 | * | 11/2011 | Grenaway et al. ...... 137/115.26 |
| 8,474,480 | B1 | * | 7/2013 | Scantlin ................ 137/488 |
| 2007/0080309 | A1 | * | 4/2007 | Daake et al. ............ 251/63.5 |
| 2012/0234396 | A1 | * | 9/2012 | Bell ...................... 137/14 |

OTHER PUBLICATIONS

"Innovation in Irrigation Nelson—Pressure Control—800 Series Control Valves", Dec. 2009, pp. 2.1-2.10, vol. 2, Nelson Irrigation Corp., Walla Walla, WA.

* cited by examiner

PRESSURE CONTROL VALVE WITH PRESSURE CYCLING CONTROL

Priority is hereby claimed from Provisional Application Ser. No. 61/650,063 filed May 22, 2012, the entirety of which is incorporated herein by reference.

This invention relates to control valves and, more specifically, to control valves particularly suited for agricultural irrigation applications where the control valve is regulated by a spool-type pressure-control valve.

BACKGROUND

Pressure-control valves (pilot- or spool-style) and sleeve- or pinch-type flow-control valves are often used in combination to regulate water-flow pressure in irrigation system conduits. In a pressure-reducing configuration, the pressure-control valve (hereinafter, the "spool valve") is used to compare the downstream pressure in the conduit, i.e., on the downstream side of the flow-control valve (hereinafter the "control valve"), to a spring setting in the spool valve. If the force created by the downstream pressure (acting on an internal diaphragm in the spool valve) is greater than the spring setting, the internal spool will move to allow water to flow into the control valve to force an internal membrane in the control valve to move substantially radially inward toward a center valve seat to thereby constrict flow through the conduit until the downstream pressure is reduced. If the force created by the downstream pressure in the conduit is less than the spring setting, the internal spool will move to allow water to vent from the control valve, and thereby permit the membrane to move away from the seat to increase flow and downstream pressure. If the force created by the downstream pressure in the conduit is equal to the spring setting, then water flow will be blocked to and from the diaphragm-controlled chamber in the spool valve, thus creating a steady-state flow through the control valve. In this condition, the spool valve is said to be in equilibrium, or in a "null position".

Currently, there are pumping systems that are susceptible to uncontrolled pressure oscillations or "cycling" between higher and lower pressures, particularly where there is compressibility in the system. Compressibility typically comes from air entrapped in the conduit. The likelihood of this condition increases as the flow rate decreases; as the incoming pressure increases; and/or as the differential between the incoming and outgoing pressure increases.

It would therefore be desirable to develop a pilot or spool-style pressure-control valve that either eliminates or substantially reduces pressure cycling in a water-flow-control valve while also improving accuracy and response time, particularly in agricultural irrigation applications where substantially constant water pressure is essential for the reliable and uniform application of water to specified areas, crops, etc.

BRIEF SUMMARY OF THE INVENTION

In one exemplary but nonlimiting embodiment, there is provided a spool valve comprising a housing including a spring-enclosing portion and a spool-enclosing portion aligned along a longitudinal axis; a spool mounted for reciprocal axial movement in the spool-enclosing portion; a piston fixed to one end of the spool; the spool-enclosing portion supporting a stationary bushing having a bore receiving an opposite control end of the spool, the bushing formed with a first plurality of radially-oriented passages opening into an annular groove formed in the bore, the groove having sloped side edges, the first plurality of radially-oriented passages aligned with a first radial port provided in the spool-enclosing portion; a sealed chamber on one side of the piston defined by a diaphragm engaged with one side of the piston and an end face of the spool-enclosing portion, the sealed chamber in communication with a second radial port provided in the spool-enclosing portion; a spring supported in the spring-enclosing portion engaged between a distal end of the spring-enclosing portion and the other side of the piston; and the opposite end of the spool supporting plural ring-seals arranged to engage the sloped side edges of the annular groove and thereby seal off the radially-oriented ports when the spool is in a neutral position, and to resiliently engage the sloped side edges upon axial movement of the spool in either of two opposite, axial directions to thereby resist axial movement away from the neutral position.

In another exemplary aspect, there is provided a spool valve comprising a housing including a spring-enclosing portion and spool-enclosing portion; a spool mounted for reciprocal axial movement in the spool-enclosing portion; a piston fixed to one end of the spool, a sealed chamber on one side of the piston defined by a diaphragm engaged with one side of the piston and an end face of the spool-enclosing portion, the sealed chamber in communication with a port provided in the spool-enclosing portion; a spring supported in the spring-enclosing portion engaged between a distal end of the spring-enclosing portion and the other side of the piston; the spool-enclosing portion supporting a stationary bushing having a bore receiving an opposite control end of the spool, the bushing formed with a first plurality of radially-oriented passages opening into the bore, the first plurality of radially-oriented passages aligned with a first radial port provided in the spool-enclosing portion; a restrictor device including an axially-slidable pin for regulating movement of the spool in a direction toward the axially-oriented port; wherein the axially-slidable pin is detached from but engageable with the spool at the end of the axially-slidable pin and engageable at an opposite end with an adjustable stop aligned with the longitudinal axis.

In still another exemplary aspect, there is provided a spool valve comprising a housing including a spring-enclosing portion and a spool enclosing portion aligned along a longitudinal axis; a spool mounted for reciprocal axial movement in the spool-enclosing portion; a piston fixed to one end of the spool; the spool-enclosing portion supporting a stationary bushing having a bore receiving an opposite control end of the spool, the bushing formed with a first plurality of radially-oriented passages opening into the bore, the first plurality of radially-oriented passages aligned with a first radial port provided in the spool-enclosing portion; a sealed chamber on one side of the piston defined by a diaphragm engaged with one side of the piston and an end face of the spool-enclosing portion, the sealed chamber in communication with a second radial port provided in the spool-enclosing portion; a spring supported in the spring-enclosing portion engaged between a distal end of the spring-enclosing portion and the other side of the piston; and a dampening device located axially between the one side of the piston and the end face of the spool-enclosing portion.

It will be appreciated that the various features described herein may be used separately or in combination as required by particular applications to reduce if not eliminate cycling, and/or to improve accuracy and response time of the pressure control valve.

The invention will now be described in greater detail in connection with the drawings identified below.

DETAILED DESCRIPTION OF THE DRAWINGS

Figure 1:
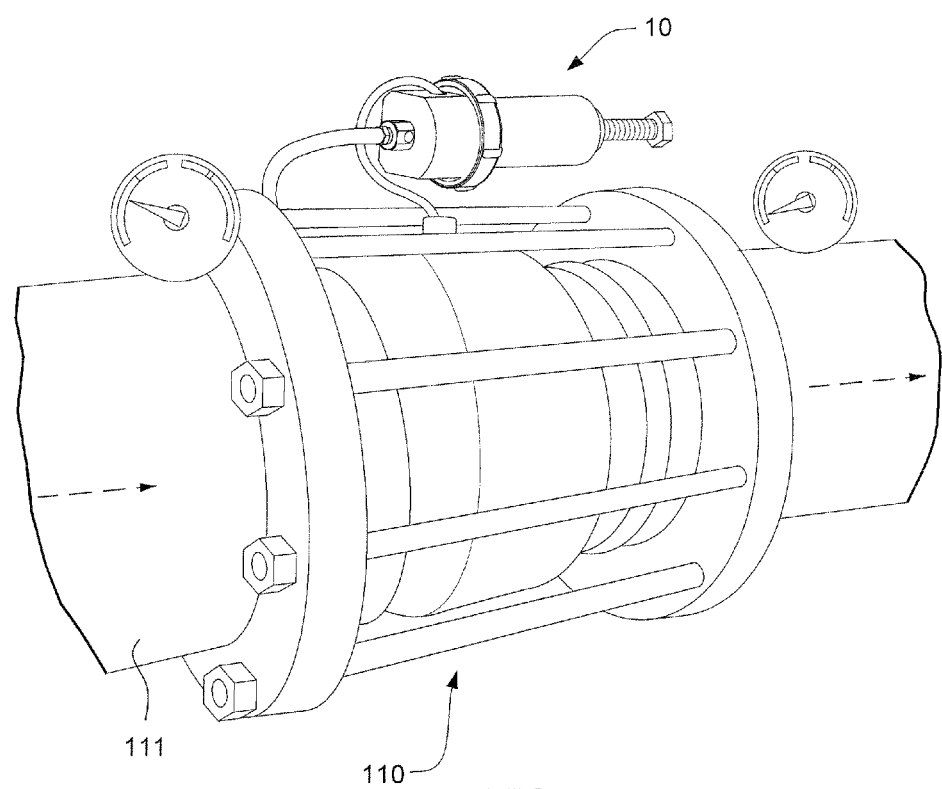
FIG. 1 is a partial, simplified schematic view of a control valve piloted by a spool valve.

With reference initially to FIG. 1, a pressure-control pilot or spool valve 10 in accordance with an exemplary but nonlimiting embodiment of the invention is adapted for operative connection to a conventional sleeve- or pinch-type flow control valve 110 in an irrigation conduit 111. Control valves of this type are often used in agricultural irrigation applications to maintain a substantially constant downstream pressure despite fluctuating upstream pressure. For convenience and ease of understanding, any reference herein to a "spool valve" or "pilot valve" will be taken to mean the pressure-control device 10 which is the subject of this invention, and reference to a "control valve" will be taken to mean the conventional, in-line, pinch-type control valve 110 controlled by the spool valve 10. This combination of a spool valve and a control valve is per se well known in the art.

Figure 2:
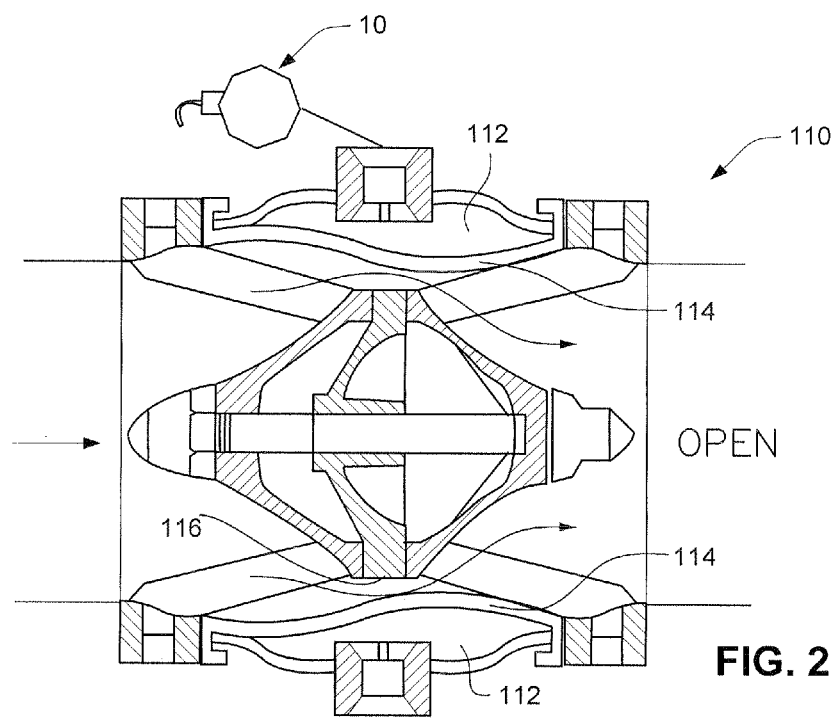
FIG. 2 is a side section of the control valve shown in FIG. 1, with the internal sleeve or membrane in a position where the valve is partially open.
Figure 3:
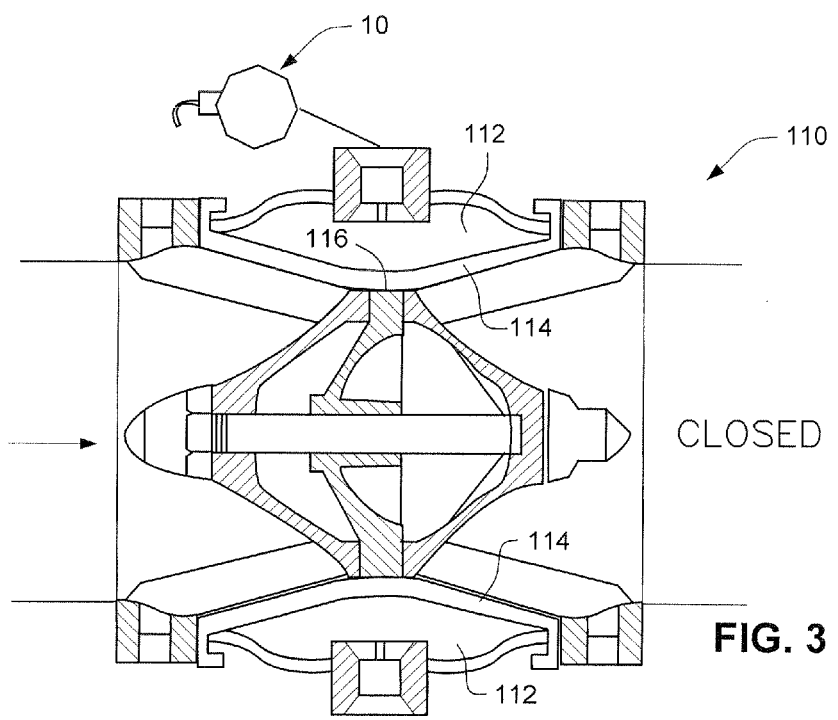
FIG. 3 is a side section of the control valve shown in FIG. 1, with the internal sleeve or membrane in a position causing the valve to be closed.
Figure 4:
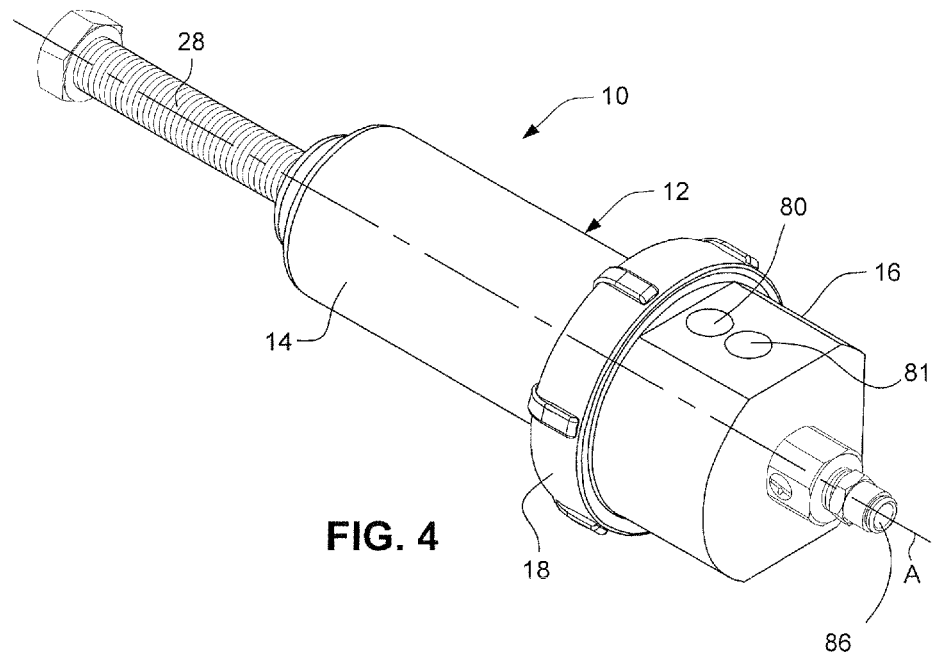
FIG. 4 is a perspective view of one side of a spool valve in accordance with a first exemplary but nonlimiting embodiment of the invention.
Figure 5:
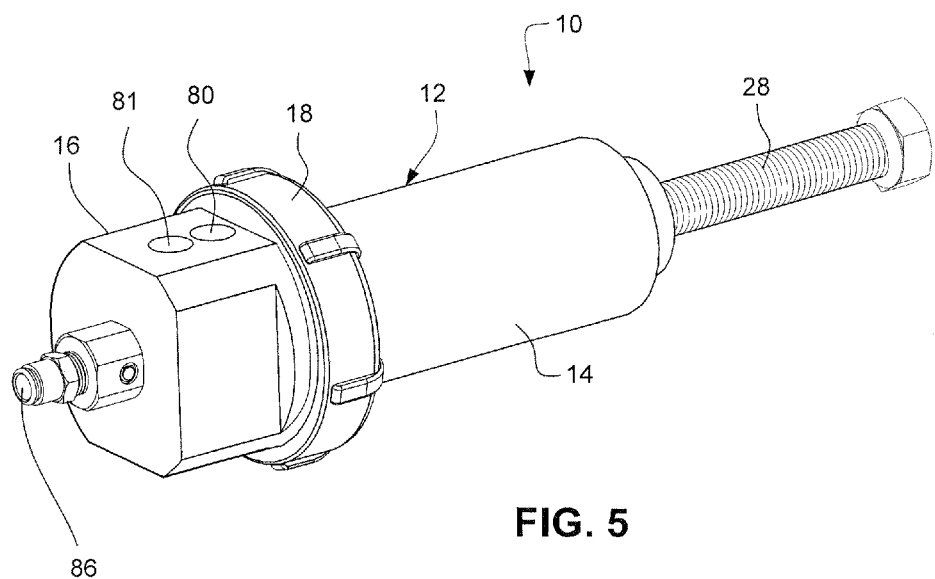
FIG. 5 is a perspective view of the spool valve of FIG. 4 but from an opposite side.

Referencing FIGS. 2 and 3, the control valve 110 may be of the type where the spool valve 10 regulates the flow of water into a sealed chamber 112 in the control valve such that a flexible sleeve or membrane 114 may be constricted about an annular seat 116 located in the flow path to reduce (see FIG. 2) or even shut off flow (see FIG. 3). Thus, when the flow enters the chamber 112, the membrane 114 engages the valve seat 116 to shut off flow through the control valve. When flow in the chamber 112 is vented by the spool valve 10, the sleeve or membrane 114 moves away from the seat 116 to partially or fully open the control valve 110 (FIG. 2).

The spool valve 10 is shown in more detail in FIGS. 4-8, and includes a housing 12 (made from e.g., plastic or brass) having a first or spring-enclosing portion 14 and a second or spool-enclosing portion 16 joined at a threaded coupling 18 (of any suitable construction and preferably of the same material as the housing 12). The spring-enclosing portion 14 is in the form of an elongated cylinder, with a piston 20 (FIGS. 6-8) mounted for reciprocal movement therein. The piston 20 supports a rubber diaphragm 22 that is connected between the piston 20 (preferably brass) and the coupling 18 to form a sealed chamber 24 (note that the term "diaphragm" is used in connection with the spool valve 10 to conveniently distinguish the diaphragm 22 from the membrane 114 of the control valve 110). Specifically, the coupling 18 clamps the outer peripheral edge of the diaphragm 22 between facing surfaces of the spring-enclosing portion 14 and the spool-enclosing portion 16. Movement of the piston to the left (as viewed in FIGS. 6-8), is resisted by a coil spring 26 (preferably made of spring steel) extending between a spring washer 27 engaged with the piston and an opposite end of the spring-enclosing portion 14. The spring pressure is adjustable by rotation of a threaded rod 28 (FIGS. 4 and 5) extending out of the distal end of the spring-enclosing portion 14 of the housing 12, with pressure indicia (not shown) applied to the rod to facilitate the adjustment.

Figure 6:
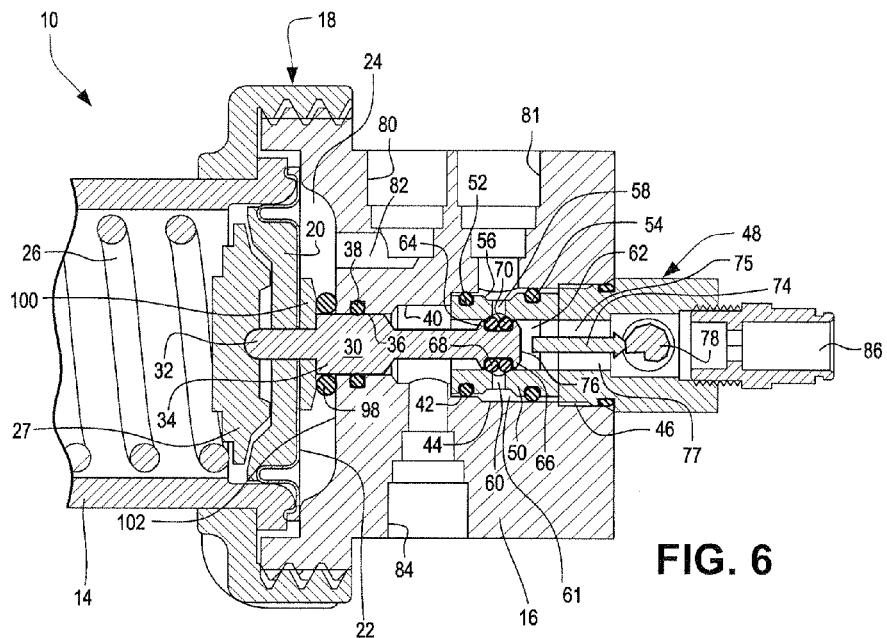
FIG. 6 is a partial section through the spool valve of FIGS. 4 and 5 in a "null" position.
Figure 7:
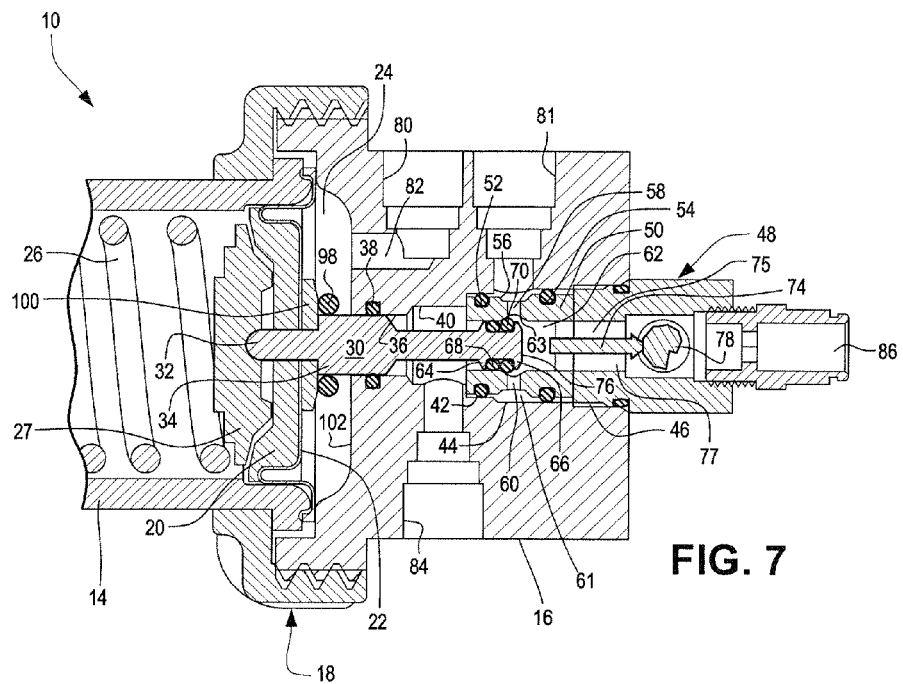
FIG. 7 is a partial section through the spool valve of FIGS. 4 and 5 in a position causing the control valve to move toward a closed position.
Figure 8:
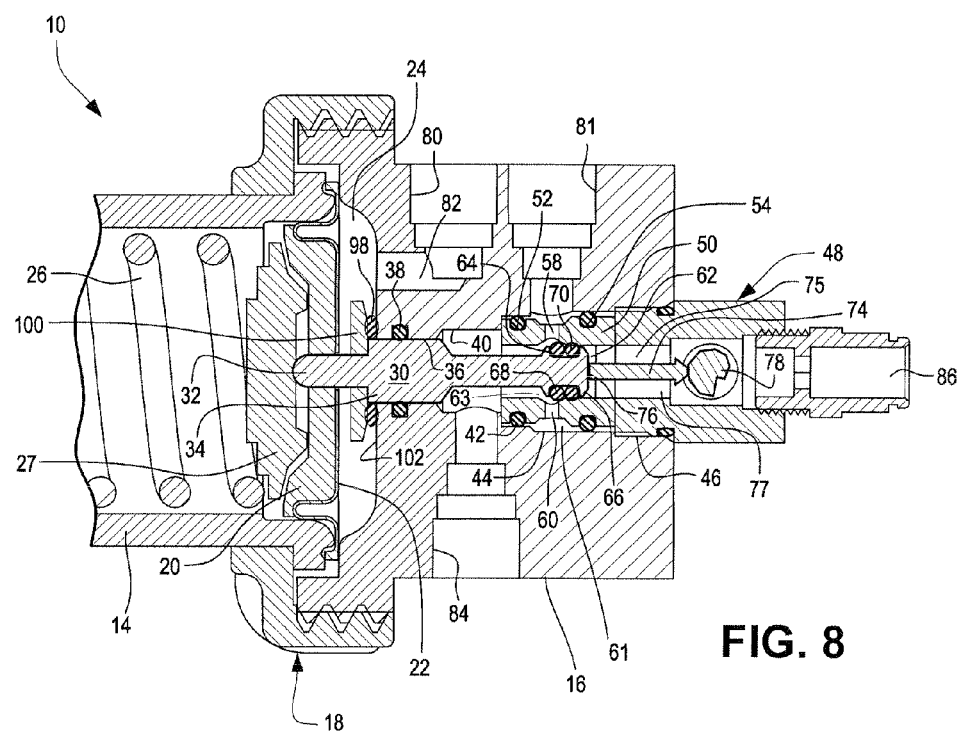
FIG. 8 is a partial section through the spool valve of FIGS. 4 and 5 in a position causing the control valve to move toward an open position.

With specific reference to FIGS. 6-8, the piston 20 is connected to a "piston rod" or spool 30 (preferably steel) that extends into the spool-enclosing portion 16 of the housing 12, along the longitudinal center axis A (FIG. 4) of the spool valve. The spool 30 includes a forward end 32 by which the spool is connected to the piston 20 by any suitable means. A larger-diameter portion 34 slides within a first bore 36 formed in the spool-enclosing portion 16, with an O-ring 38 or other ring-type seal located in an annular groove provided in the spool-enclosing portion 16 engaging the larger-diameter portion 34 of the spool 30. The first bore 36 opens to stepped, counterbore portions 40, 42 and extending to a threaded end 46 that receives a restrictor device 48 (preferably made of brass) described further herein.

Within the counterbore portions 42, 44 (to the right of counterbore portion 40 as viewed in FIGS. 6-8) there is a fixed bushing 50 (preferably made of Teflon® or other suitable plastic) formed with axially-spaced annular grooves that receive a pair of axially-spaced O-rings 52, 54, respectively, which seal against the counterbore surfaces 42, 44. An outer annular groove 56 is formed axially between the O-rings 52, 54, and radial passages 58, 60 are located circumferentially about the groove 56. It will be appreciated that while two radial passages 58, 60 are shown, there are preferably four or more such passages located about the groove 56. The radial passages 58, 60 (and others not visible), communicate with an annular space 61 between the O-rings 52, 54 which, in turn, communicates with the radial port 81 which steps down in diameter from the outer surface of the spool-enclosing portion 16 to its radially-inner end adjacent the annular space 61. Depending on the axial position of the spool 30, the radial port 81 may communicate with the counterbore 40 or bore 62 formed within the bushing 50 as described further herein. The bore 62 is formed with an inner annular groove 63, aligned with outer annular groove 56 as well as the radial passages 58, 60. From the spool valve, the port 81 communicates with the sealed chamber 112 surrounding the membrane 114 in the control valve 110.

The end of the spool 30 opposite the piston 20 is formed with radial flanges 64, 66 which define an annular groove therebetween for receiving a pair of side-by-side O-rings 68, 70. An axially "floating" restrictor pin 74 is engageable with the end 76 of the spool and extends co-axially toward a restrictor cam 78 within the restrictor device 48 as also described further below. The pin 74 extends through a center bore 75 formed in one end portion of the restrictor device 48.

Another, radially-oriented port 80 extends into the spool-enclosing portion 16 and connects to the chamber 24 via passage 82. The port 80 communicates with the fluid supply in conduit ill on the downstream side of the control valve 110.

A third radially-oriented port 84 connects to the counterbore 40 and vents to atmosphere, while a fourth axially-oriented port 86 communicates with the fluid supply upstream of the control valve 110, the restrictor device 48 and bore 62 in the bushing 50 via axial bores 77, 79 in the restrictor device 48 (FIGS. 10-12) that surround the pin 74 and its center bore.

Generally, if the force created by the downstream pressure acting on the diaphragm 22 is greater than the setting for spring 26, water will flow into the sealed chamber 112 of the control valve 110, moving the membrane 114 closer to the valve seat 116, thereby constricting flow through the control valve until the pressure is reduced. If the force created by the downstream pressure is less than the spring setting, then water will exit the sealed chamber 112 in the control valve 110 allowing the membrane 114 to move away from the valve seat 116, the water exiting the vent port 84 in the spool valve 10 until the downstream pressure is increased. If the force created by the downstream pressure is equal to the spring setting, then there will be no movement of the piston 20 and no flow into or out of the chamber 24 via port 80, and flow will be blocked to and from the sealed chamber 112 of the control valve. The manner in which the spool valve controls/reacts to these three conditions is described in greater detail below.

With specific reference to FIG. 6, in the "null" or "equilibrium" condition, flow into the port 80 is balanced by the force of spring 26 so that the spool is positioned with O-rings 68, 70 centered over and block the radial passages 58, 60, blocking flow through port 86, bore 62, and any venting of flow through port 84. As a result, no water enters or leaves the spool valve 10 via ports 81, 84 or 86 when the spool 30 is in the null position.

FIG. 7 illustrates the condition where the downstream pressure (i.e., downstream of the control valve 110) is greater than the pressure exerted by the spring 26 on the piston 20. As a result, water enters the port 80 and chamber 24, pushing the piston 20 to the left as viewed in FIG. 7, thereby also moving the spool to the left, such that water from the upstream or fourth port 86 is allowed to flow into the bore 62, through the radial passages 58, 60, exit the port 81 and flow into the chamber 112 of the control valve 110. The membrane 114 is caused to move toward the valve seat 116 to restrict flow through the control valve 110 and thus decrease downstream pressure.

In the event the downstream pressure is lower than desired, the spring 26 will push the piston 20 to the right as viewed in FIG. 8, thereby pushing the spool 30 to the right, blocking port 86 by sealing the bore 62 (via O-rings 68, 70 engaging the bore wall) but permitting water in the chamber 112 of the control valve to flow in a reverse direction, through the port 81 and radial passages 58, 60, exiting or venting through port 84. This results in the membrane 114 moving away from the seat 116, thus permitting increased flow through the control valve 110 to increase the downstream pressure.

In the exemplary but nonlimiting embodiments described herein, three features provide a significant aid in cycling control, accuracy and response time. Each feature can be used independently, but it will be understood that there may be conditions where two or all three components/features may be required to work together to more effectively reduce or eliminate the undesired cycling, and to also achieve better accuracy and response time.

The first feature involves the annular, internal groove 63 (best seen in FIGS. 7 and 8) in the bushing 50, aligned with the radial passages 58, 60 and that interacts with the spool O-rings 68, 70 to improve the delivery of water flow in and out of the control valve. Specifically, the elastomeric O-rings 68, 70 are compressed and thus exert a force on the sloped or beveled edge surfaces of the groove 63 as viewed in FIG. 6. As the spool moves away from the null position shown in FIG. 6 to the left as shown in FIG. 7, the force exerted by O-ring 68 resists movement of the spool 30 away from the null position, providing enhanced control of the spool 30 as it permits water to flow into the chamber 112 in the control valve 110. Similar resistance to movement of the spool 30 away from the null position is experienced as the spool moves from the position in FIG. 6 to the right as shown in FIG. 8, with O-ring 70 engaging the opposite sloped or beveled edge surface of the groove 63.

On the other hand, as the spool 30 moves toward the null position (from the left or right), the expansion of the O-rings (68 or 70, depending on direction of movement as the O-rings pass over the respective beveled or tapered edges on either side of the groove 63) eases movement of the spool 30 to the null position. In other words, the O-ring and groove configuration creates forces that tend to move the spool 30 to the null position, and resist movement of the spool 30 away from the null position. The constraints on movement of the spool and the tendency to center the spool in the null position prevents "overshooting" of the spool 30 that is often present in a cycling condition.

A second feature relates to the vent restrictor device 48 attached to the end of the spool valve opposite the piston/spring adjustment end, for controlling the venting of water from the control valve 110 when the spool 30 moves to the right as viewed in FIG. 8. In this position, water flows out of the chamber 112 in the control valve 110 (to partially or fully open the control valve) to increase flow and downstream pressure, and to vent flow through the port 84. By limiting the rightward movement of the spool to a desired length of travel via the restrictor device 48, better and more accurate control is maintained.

Figure 9:
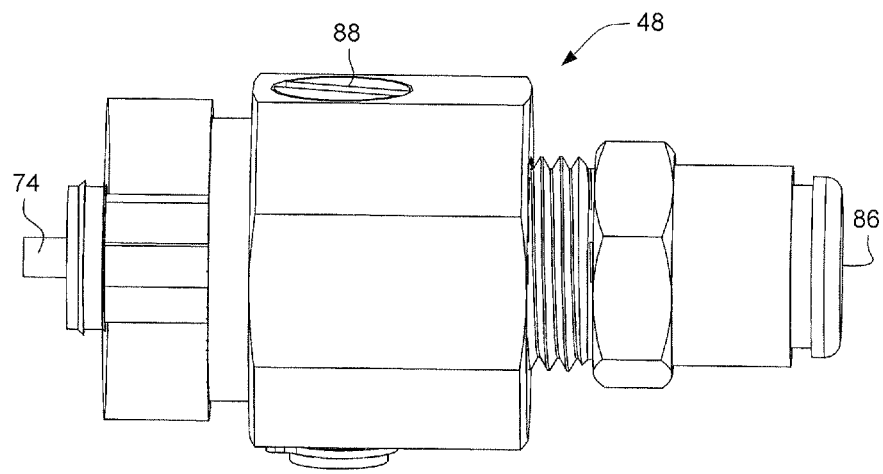
FIG. 9 is a side view of a restrictor device incorporated in the spool valve of FIGS. 1-8.

More specifically, in one exemplary but nonlimiting embodiment, the notched cam-style restrictor (see FIGS. 6-10) is provided with set positions corresponding to different degrees of restriction. Thus, when the spool 30 moves to the right as described above in connection with FIG. 8, the axially-floating pin 74 is engaged by the end 76 of the spool 30 and also pushed to the right where it engages the cam 78. It will be appreciated by rotating the cam 78 by the adjustment screw 88 (FIG. 9), different flat surfaces 90, 92, 94, 96, (FIG. 10) etc. may be engaged by the floating pin 74, thus controlling the extent of axial movement of the spool 30. This, in turn, controls the degree of restriction of flow in the venting mode of the spool valve. In other words, the various angled and/or notched surfaces of the cam 78 set the degree of movement of the floating pin 74, and thus the movement of the spool 30 to the right as viewed in FIG. 8. Note that when the spool moves to the left as shown in FIG. 7, the floating pin 74 is disengaged from the spool 30, taking the restrictor device 48 out of play. The restrictor device 48 may thus be adjusted as needed to control the venting process so as to minimize or eliminate any cycling condition which may surface in operation of the control valve. Suitable indicia may be applied to the restrictor device 48, near or on the adjustment screw 88, to aid the user in setting the proper restriction.

Figure 11:
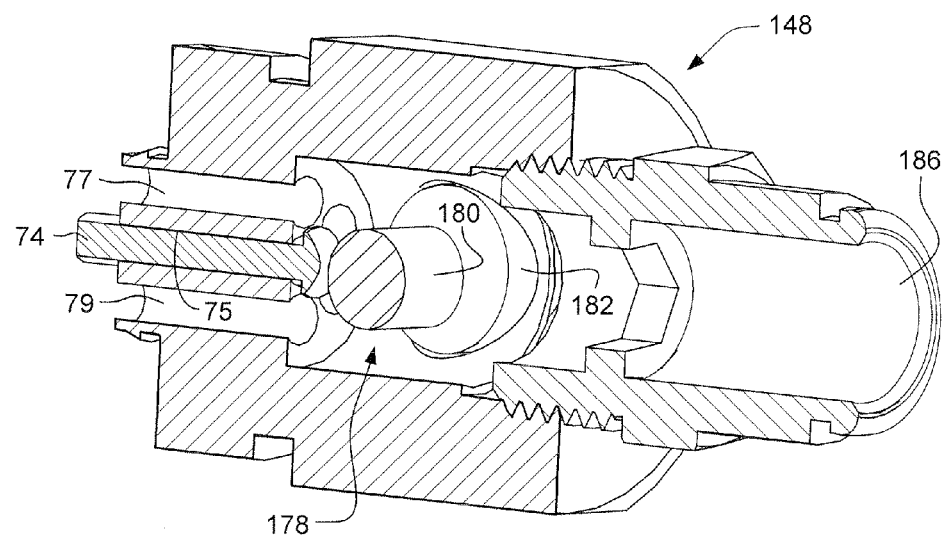
FIG. 11 is a section view through another exemplary restrictor device that may be used with the spool valve of FIGS. 1-8.

In a second exemplary embodiment illustrated in FIG. 11, a restrictor device 148 incorporates a round but eccentrically-mounted cam 178 that is used to set the desired vent restriction. This alternative adjustment cam has a circular cam surface 180, but is mounted eccentrically relative to the center axis of the adjustment screw 182. As a result, with the floating pin 74 pressed by the spool to the right as shown (and with flow through the port 186 closed as described above in connection with FIG. 8), rotation of the screw 182 will have the effect of moving the cam surface 180 axially to the right or left depending on direction of rotation of the screw, and thus, via floating pin 74, control the amount of axial movement of the spool 30 to the right as viewed in FIG. 11.

In another exemplary embodiment (see FIG. 12), a restrictor component 248 incorporates a "nautical-curve" cam 278 to set the desired vent restriction. More specifically, the continuously curved cam surface 280 is not only non-circular, but also includes a notched surface 282 that permits various adjustments to the limits of movement of the floating pin 74 and thus of the spool 30 in connection with venting through port 84, with flow through the port 286 shut off as described above.

Figure 10:
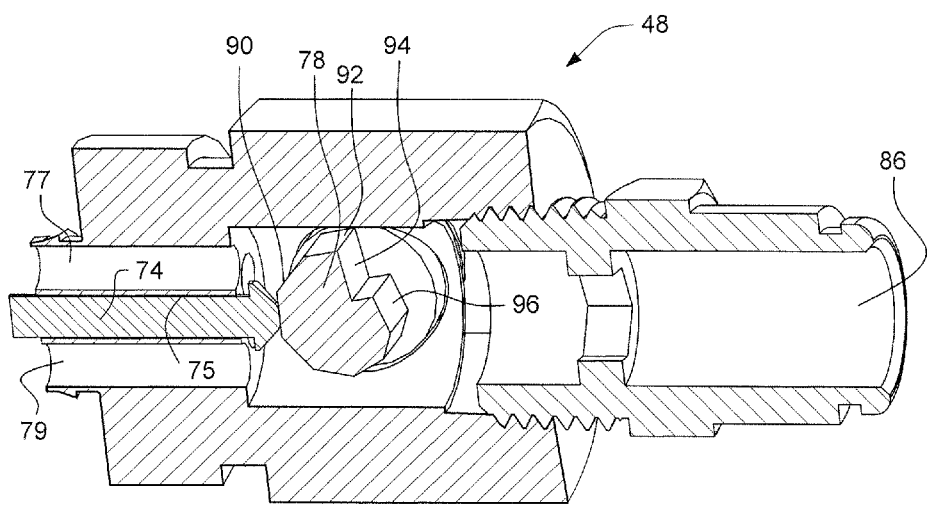
FIG. 10 is a section view through the restrictor device shown in FIG. 9.
Figure 12:
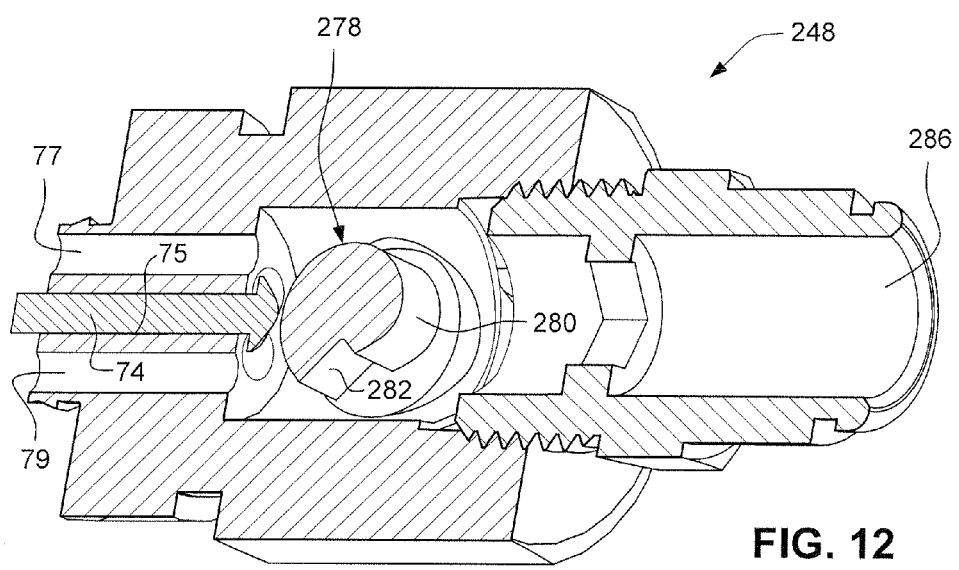
FIG. 12 is a section view through still another exemplary restrictor device that may be used with the spool valve of FIGS. 1-8.

In the embodiments described in connection with FIGS. 10-12, it is important that the floating pin 74 engage the respective cam on a surface perpendicular to the longitudinal center axis A of the spool 30.

Figure 13:
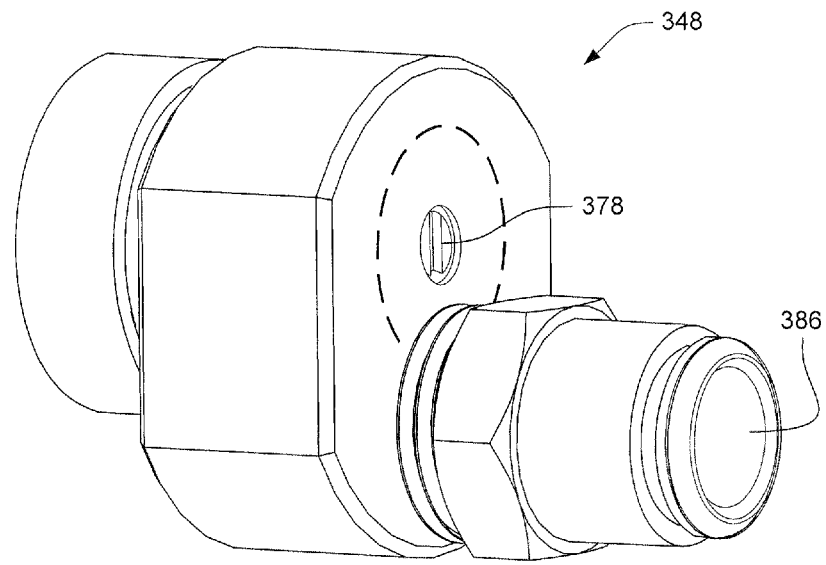
FIG. 13 is a side view of still another restrictor device that may be used with the spool valve of FIGS. 1-8.
Figure 14:
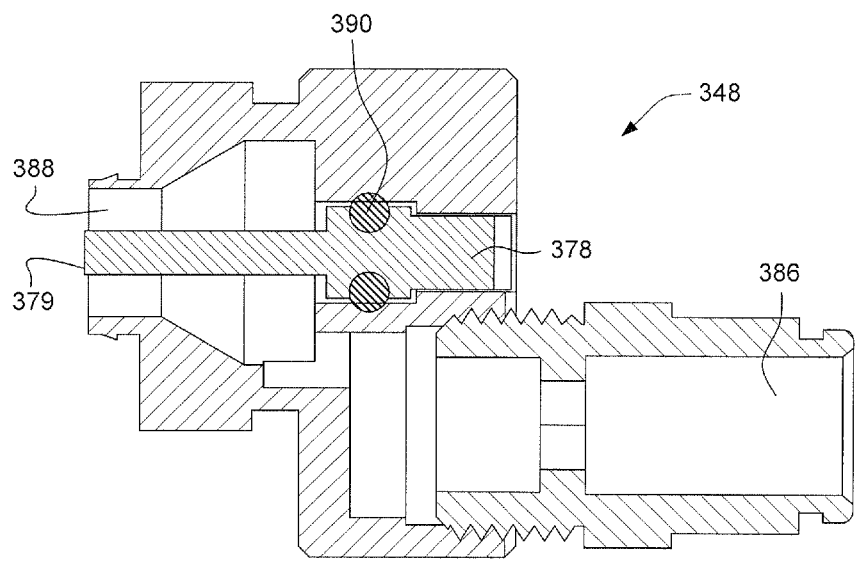
FIG. 14 is a section view through the restrictor device of FIG. 13.

In still another exemplary embodiment (see FIGS. 13, 14), a restrictor device 348 is configured to incorporate an axially-oriented adjustment screw 378 for regulating/adjusting or controlling the degree of restriction in the venting mode. More specifically, FIGS. 13 and 14 disclose a restrictor device where the port 386 is axially offset from the passage 388 that is axially-aligned with the spool. This permits access to the axially-oriented adjustment screw 378 along an end face of the restrictor device. In this exemplary embodiment, with flow through the port 386 shut off, axial adjustment of the screw 378 within a threaded bore in the restrictor device 348 will provide a direct, desired limit stop surface 379 for engagement by the spool 30 as it moves to the right as viewed in FIGS. 13 and 14. An O-ring 390 seals against the wall of the restrictor device, preventing any leakage axially along the screw shank.

Figure 15:
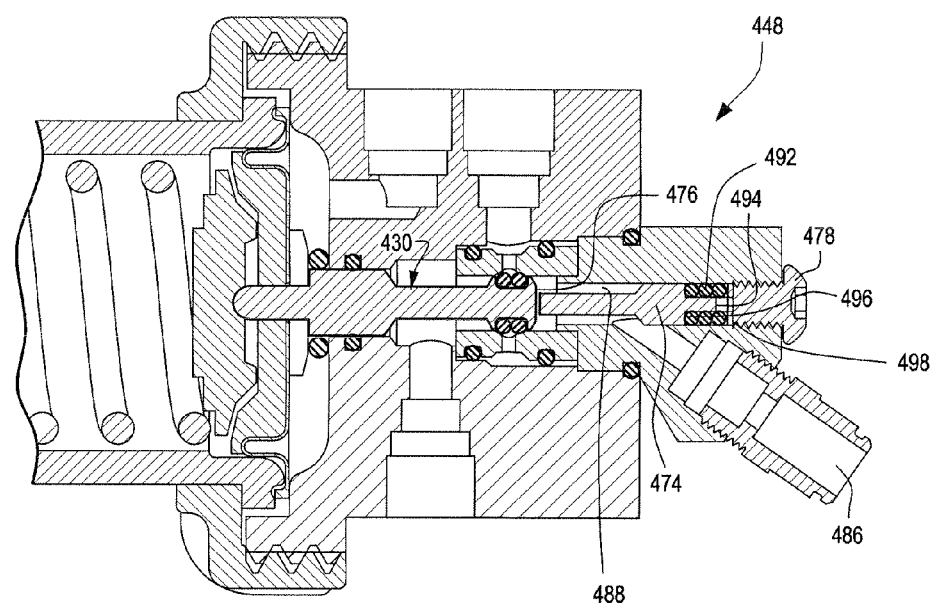
FIG. 15 is a partial section view through a spool valve in accordance with another exemplary but nonlimiting embodiment.

In a preferred arrangement shown in FIG. 15, a restrictor device 448 is also configured to incorporate an axially-oriented adjustment screw 478 for regulating/adjusting the degree of restriction in the venting mode. The port 486 in this embodiment is oriented at an acute angle to the restrictor bore 488 (and thus also the axis A), ensuring access to the adjustment screw 478, as well as a direct, axially implemented adjustment of the pin 474.

In this embodiment, the axially-floating pin 474 and the adjustment screw 478 are axially separated by O-rings 492 mounted over a reduced-diameter end 494 of the pin 474, abutting the screw 478 at one end and a shoulder 496 on the pin 474 at an opposite end (a spacer-washer 498 may be interposed between the O-ring and the screw). This arrangement dampens the movement of the pin 474 it approaches and engages the screw 478, and thus provides smoother, more controlled movement of the spool 430 to the right as viewed in FIG. 15 as the spool end 476 engages the pin 474, further contributing to improved performance and response time while reducing the risk of cycling.

The third significant feature relates to the further control of the vent restrictor 48 applied via a compressible, elastomeric ring 98 (FIGS. 6-8). Specifically, the elastomeric ring 98 is located on the spool 30, axially between a piston retainer 100 fixed to the spool and an internal face surface 102 of the spool housing. As best seen in FIG. 8, when the spool 30 moves to the right to initiate venting of the control valve chamber 112 to thereby open or partially open the control valve 110 as discussed above, movement of the spool 30 will be resisted and damped by compression of the ring 98 against the facing surface 102, prior to engagement of the floating pin 74 with the restrictor device cams as described above in connection with FIGS. 8-12 and/or prior to engagement of limit stop surface 379 (FIG. 14) or pin 474 (FIG. 15). It will be understood that other compression devices could be used, for example, a spring washer, coil spring, etc. to provide the desired control. The compressibility or resiliency of the selected compression device may also be employed to achieve the desired damping/control of the spool movement.

Figure 16:
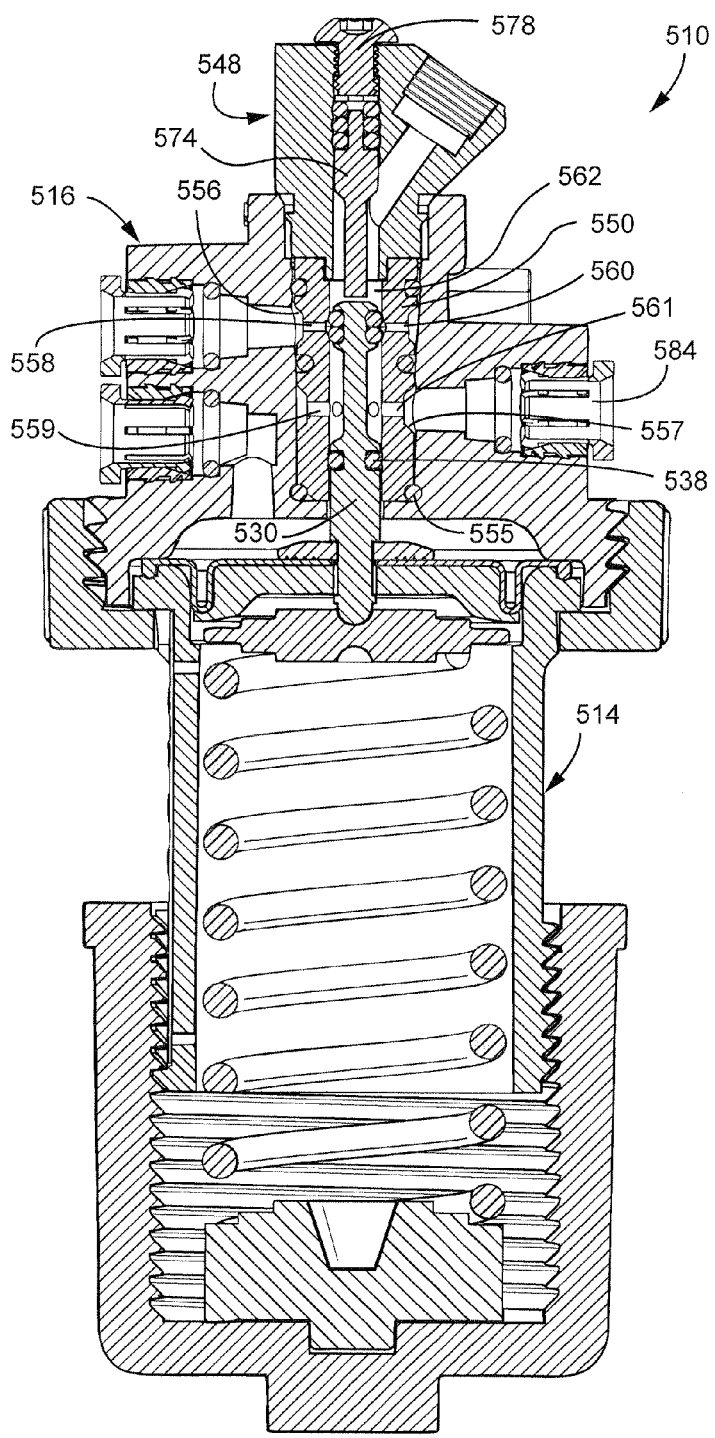
FIG. 16 is a section view through a spool valve in accordance with another exemplary but nonlimiting embodiment.

Turning to FIG. 16, a spool valve 510 in accordance with another exemplary but nonlimiting embodiment of the invention is illustrated. The spool valve, including the spring-enclosing portion 514, spool-enclosing portion 516 and spool 530 and including the various ports, are similar to the embodiments described above. The spool valve also functions in substantially the same manner as the spool valve previously described, and the restrictor device 548, including pin 574 and adjustment screw 578, are substantially as shown in FIG. 15. In this embodiment however, the bushing 550 has been extended axially substantially to the far left end of the spool-enclosing housing portion 516, beyond the vent port 584. In addition to the outer annular groove 556 and radial passages 558, 560 that are similar to groove 56 and radial passages 58, 60, the extended bushing 550 is also provided with an outer annular groove 557 and radial passages 559, 561 which communicate with the radial port 584. An additional O-ring 555 has been added to the end of the spool 530, remote from the restrictor device 548. The spool 530 has been modified to accept an annular ring seal 538 (e.g., a conventional O-ring) to seal the spool relative to the bushing bore 562. While this arrangement functions in substantially the same manner as the previously-described embodiments, manufacturing is simplified and thus less costly, with no sacrifice in performance or cycling prevention.

Figure 17:
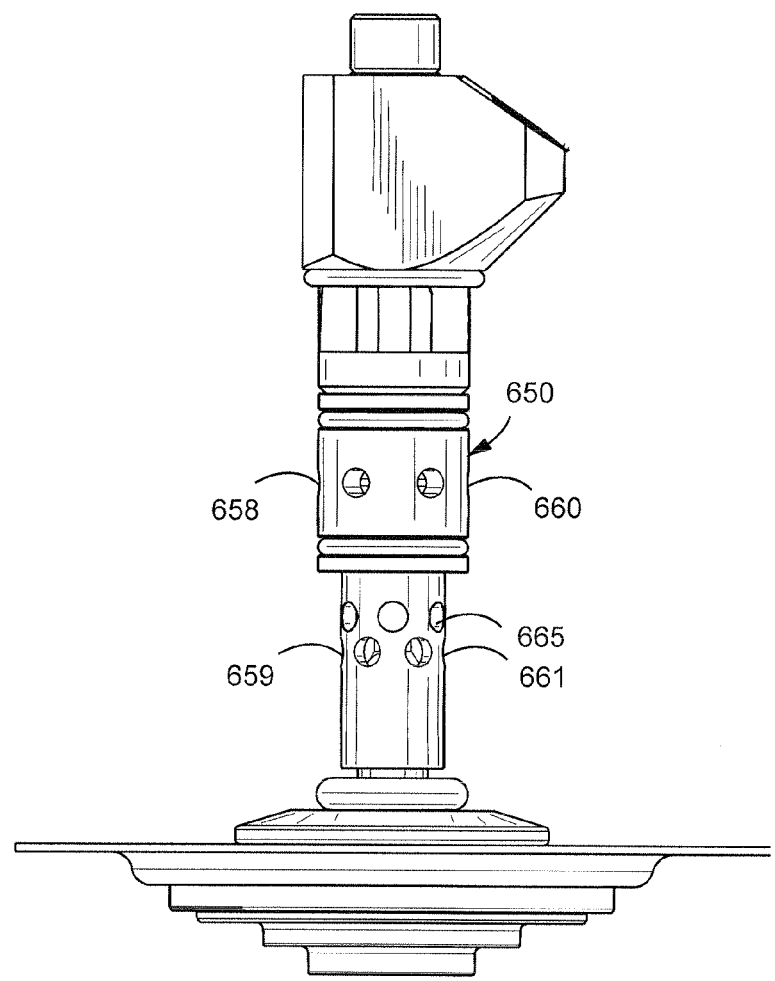
FIG. 17 is a side elevation of a spool and diaphragm assembly for a spool valve in accordance with yet another exemplary but nonlimiting embodiment.
Figure 18:
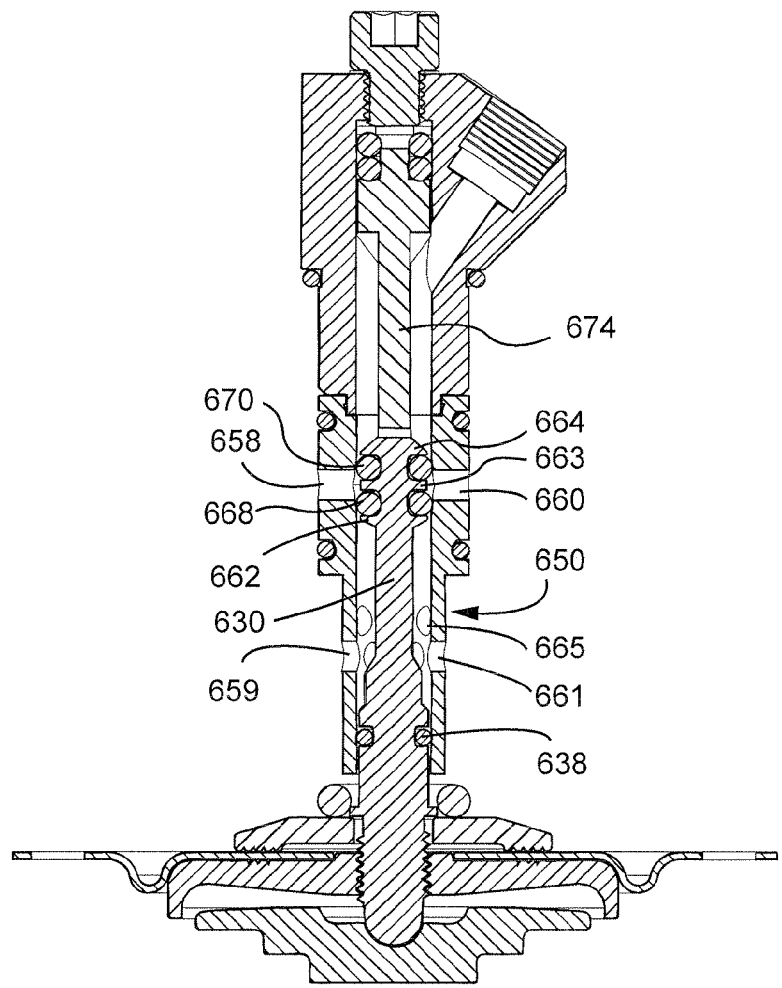
FIG. 18 is a section taken through the spool and diaphragm assembly of FIG. 17.

FIGS. 17 and 18 show an alternative spool/bushing construction where the side-by-side O-rings 668 and 670 carried by the spool 630 are physically separated by an additional annular radial flange 663 formed on the spool, axially between the spool flanges 662, 664. Spool 630 otherwise interacts with the pin 674 as described above in connection with the embodiments shown in FIGS. 15 and 16.

The bushing surrounding the spool may be constructed as in the embodiments shown in FIGS. 6-8 or as shown in the embodiment in FIG. 16. As shown, the spool 630 carries an additional O-ring 638 similar to the O-ring 538 in FIG. 16, and the bushing 650 is extended in length but is designed for a different housing application than the bushing 550 in FIG. 15. The radial passages 658, 660 are similar to passages 558, 560, and radial passages 659 and 661 are similar to passages 559 and 561 in FIG. 15, but bushing 650 adds an axially-spaced grouping of radial passages 665 that supplement the function of passages 659, 661 and interact with the radial vent port in the housing.

Figure 19:
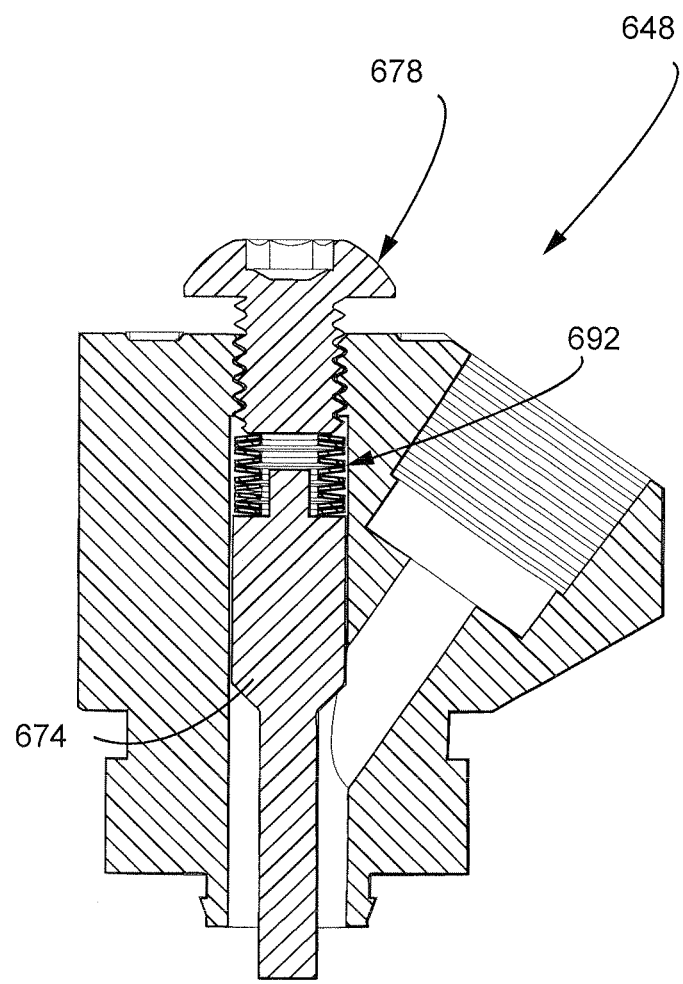
FIG. 19 is a section view through another exemplary restrictor device that may be used in any of the spool valves described herein.

FIG. 19 shows yet another restrictor device 648 wherein a series of stacked Belleville washers 692 are supported on the pin 674 in place of the plurality of O-rings 492 in FIG. 15. The adjustment screw 678 otherwise interacts with the pin 674 in the same manner.

Figure 20:
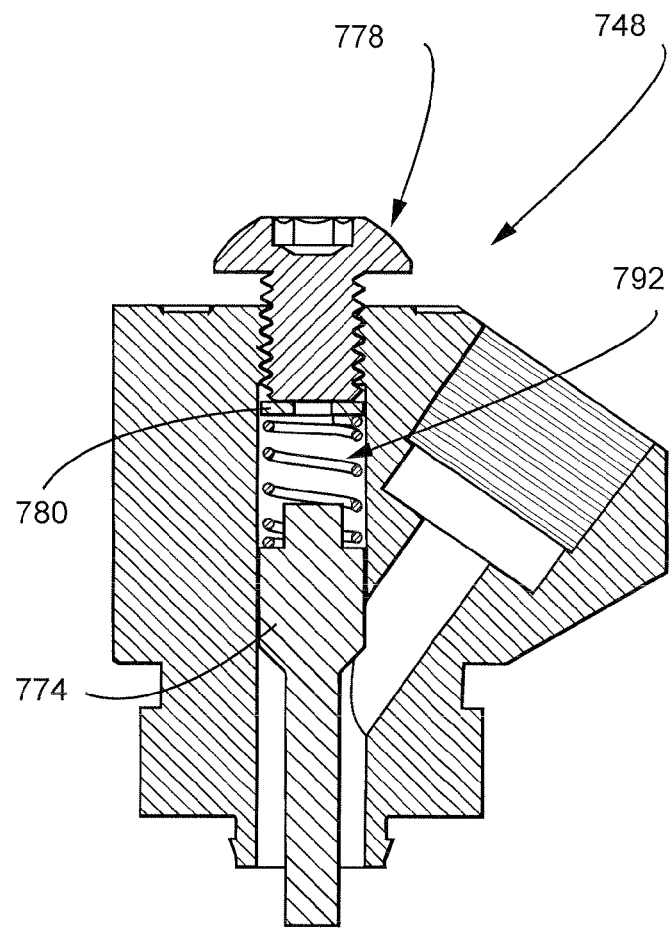
FIG. 20 is a section view through another exemplary restrictor device that may be used with any of the spool valves described herein.

FIG. 20 shows an alternative restrictor device 748 where a coil spring 792 is supported on the pin 774 as an alternative to the stacked O-rings 492 shown in the embodiment of FIG. 15 and the Belleville washers 692 in FIG. 19. The spring force exerted on the pin 774 is adjusted by the screw 778, and as in FIG. 15, a washer 780 may be interposed between the spring and the screw.

It will be appreciated that the relative dimensions of the various components and the materials from which they are made may vary with specific applications.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed:

1. A spool valve comprising:
   a housing including a spring-enclosing portion and a spool-enclosing portion aligned along a longitudinal axis;
   a spool mounted for reciprocal axial movement in said spool-enclosing portion;
   a piston fixed to one end of the spool;
   said spool-enclosing portion supporting a stationary bushing having a bore receiving an opposite control end of the spool, the bushing formed with a first plurality of radially-oriented passages opening into an annular groove formed in said bore said groove having sloped side edges said first plurality of radially-oriented passages aligned with a first radial port provided in said spool-enclosing portion;
   a sealed chamber on one side of said piston defined by a diaphragm engaged with one side of said piston and an end face of said spool-enclosing portion, said sealed chamber in communication with a second radial port provided in said spool-enclosing portion; a spring supported in said spring-enclosing portion engaged between a distal end of said spring-enclosing portion and the other side of said piston; and
   said opposite end of the spool supporting plural ring-seals arranged to engage the sloped side edges of the annular groove and thereby seal off said radially-oriented passages when said spool is in a neutral position, and to resiliently engage said sloped side edges upon axial movement of the spool in either of two opposite, axial directions to thereby resist axial movement away from said neutral position.

2. The spool valve of claim 1 wherein said plural ring-seals comprise side-by-side O-rings.

3. The spool valve of claim 1 wherein said plural ring-seals comprise a pair of axially-separated O-rings.

4. The spool valve of claim 1 wherein a dampening device is located axially between said one side of said piston and said end face of said spool-enclosing portion.

5. The spool valve of claim 4 wherein said dampening device comprises an O-ring.

6. The spool valve of claim 1 wherein said spool-enclosing portion is provided with another port at a distal end of said spool-enclosing portion; and a restrictor device including an axially-slidable pin for regulating movement of said spool in a direction away from said spring-enclosing portion; wherein said axially-slidable pin is detached from but engageable with said spool at one end of said axially-slidable pin.

7. The spool valve of claim 6 wherein movement of said axially-slidable pin is controlled by a selectively adjustable cam engageable with an opposite end of said axially-slidable pin.

8. The spool valve of claim 6 wherein movement of said axially-slidable pin is controlled by a selectively adjustable screw engageable with an opposite end of said axially-slidable pin.

9. The spool valve of claim 8 wherein a damper is inserted between said selectively-adjustable screw and said opposite end of said axially-slidable pin.

10. The spool valve of claim 9 wherein said damper comprises plural O-rings.

11. The spool valve of claim 9 wherein said damper comprises plural, stacked Belleville washers.

12. The spool valve of claim 9 wherein said damper comprises a coil spring.

13. The spool valve of claim 1 wherein said bushing has a length dimension corresponding to substantially a length of said spool-enclosing portion.

14. The spool valve of claim 13 wherein said bushing is formed with another plurality of radially-oriented passages axially-spaced from said first plurality of radially-oriented passages and in radial alignment with a third radial port provided in said spool-enclosing portion.

15. The spool valve of claim 6 wherein a dampening device is located axially between said one end of said piston and said end face of said spool-enclosing portion.

16. A spool valve comprising:
   a housing including a spring-enclosing portion and spool-enclosing portion;
   a spool mounted for reciprocal axial movement in said spool-enclosing portion;
   a piston fixed to one end of the spool, a sealed chamber on one side of said piston defined by a diaphragm engaged with one side of said piston and an end face of said spool-enclosing portion, said sealed chamber in communication with a port provided in said spool-enclosing portion; a spring supported in said spring-enclosing portion engaged between a distal end of said spring-enclosing portion and the other side of said piston;
   said spool-enclosing portion supporting a stationary bushing having a bore receiving an opposite control end of the spool, the bushing formed with a first plurality of radially-oriented passages opening into said bore, said first plurality of radially-oriented passages aligned with a first radial port provided in said spool-enclosing portion;
   a restrictor device including an axially-slidable pin for regulating movement of said spool in a direction toward said axially-oriented port; wherein said axially-slidable pin is detached from but engageable with said spool at one said end of said axially-slidable pin and engageable at an opposite end with an adjustable stop aligned with said longitudinal axis.

17. The spool valve of claim 16 wherein said adjustable stop comprises a rotatably adjustable cam.

18. The spool valve of claim 16 wherein said adjustable stop comprises a screw.

19. The spool valve of claim 18 wherein a damper is inserted between said screw and said opposite end of said axially-slidable pin.

20. The spool valve of claim 19 wherein said damper comprises a coil spring, plural O-rings or plural Belleville washers.

21. A spool valve of comprising:
- a housing including a spring-enclosing portion and a spool-enclosing portion aligned along a longitudinal axis;
- a spool mounted for reciprocal axial movement in said spool-enclosing portion;
- a piston fixed to one end of the spool;
- said spool-enclosing portion supporting a stationary bushing having a bore receiving an opposite control end of the spool, the bushing formed with a first plurality of radially-oriented passages opening into said bore, said first plurality of radially-oriented passages aligned with a first radial port provided in said spool-enclosing portion;
- a sealed chamber on one side of said piston defined by a diaphragm engaged with one side of said piston and an end face of said spool-enclosing portion, said sealed chamber in communication with a second radial port provided in said spool-enclosing portion; a spring supported in said spring-enclosing portion engaged between a distal end of said spring-enclosing portion and the other side of said piston; and
- a dampening device located axially between said one side of said piston and said end face of said spool-enclosing portion,
- wherein said spool-enclosing portion is provided with another port at a distal end of said spool-enclosing portion, said another port oriented at an acute angle relative to said longitudinal axis; and wherein a restrictor device is provided including an axially-slidable pin for regulating movement of said spool in a direction toward said axially-oriented port, said axially-slidable pin detached from but engageable with said spool at one end of said axially-slidable pin and engageable at an opposite end with an adjustable screw aligned with said longitudinal axis.

22. The spool valve of claim 21 wherein a damper is inserted between said adjustable screw and said opposite end of said axially-slidable pin.

23. The spool valve of claim 22 wherein said groove is formed with sloped side edges, said opposite end of the spool supporting plural ring-seals arranged to engage said sloped side edges and thereby seal off said radially-oriented passages when said spool is in a neutral position, and to resiliently engage said sloped side edges upon axial movement of the spool in either of two opposite directions to thereby resist movement away from said neutral position.

* * * * *